United States Patent
Samadani

(10) Patent No.: US 7,388,999 B2
(45) Date of Patent: *Jun. 17, 2008

(54) TRANSFORMATIONS FOR DENOISING IMAGES

(75) Inventor: Ramin Samadani, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 644 days.

This patent is subject to a terminal disclaimer.

(21) Appl. No.: 10/696,140

(22) Filed: Oct. 29, 2003

(65) Prior Publication Data

US 2005/0094893 A1 May 5, 2005

(51) Int. Cl.
*G06K 9/40* (2006.01)
*G06K 9/46* (2006.01)

(52) U.S. Cl. .................. 382/275; 382/250; 382/233; 382/268

(58) Field of Classification Search ............ 382/268, 382/233, 275, 250, 248
See application file for complete search history.

(56) References Cited

U.S. PATENT DOCUMENTS

| | | | | |
|---|---|---|---|---|
| 5,046,121 | A * | 9/1991 | Yonekawa et al. | 382/250 |
| 5,311,305 | A * | 5/1994 | Mahadevan et al. | 348/169 |
| 5,737,451 | A * | 4/1998 | Gandhi et al. | 382/268 |
| 5,957,998 | A * | 9/1999 | Ozaki | 708/402 |
| 6,473,534 | B1 * | 10/2002 | Merhav et al. | 382/250 |
| 7,027,661 | B2 * | 4/2006 | Estevez et al. | 382/275 |
| 7,082,450 | B2 * | 7/2006 | Hallapuro et al. | 708/402 |
| 2002/0106027 | A1 | 8/2002 | Moon-Ho et al. | |
| 2002/0131647 | A1 * | 9/2002 | Matthews | 382/268 |
| 2003/0081854 | A1 * | 5/2003 | Deshpande | 382/261 |
| 2003/0086623 | A1 * | 5/2003 | Berkner et al. | 382/260 |
| 2004/0240556 | A1 * | 12/2004 | Winger et al. | 375/240.18 |
| 2005/0013358 | A1 * | 1/2005 | Song et al. | 375/240.2 |
| 2005/0078872 | A1 * | 4/2005 | Samadani et al. | 382/233 |

OTHER PUBLICATIONS

Nostratinia, A.—"Enhancement of JPEG-Compressed Images by Re-Application of JPEG"—Journal of VLSI Signal Processing Systems vol. 27 No. 1/2—Feb. 2001.
Malvar H S et al—"Low-Complexity Transform and Quantization in H.264/AVC"—IEEE Transactions on Circuits and Systems—vol. 13 No. 7—Jul. 2003.
Lang M et al—"Noise Reduction Using an Undecimated Discrete Wavelet Transform"—IEEE Signal Processing Letters—vol. 3 No. 1—1996.
Liang J et al—Fast Multiplierless Approximations of the DCT With the Lifting Scheme—IEEE Transactions on Signal Processing—vol. 49 No. 12—Dec. 2001.
Kasezawa T—"Blocking Artifacts Reduction Using Discrete Cosine Transform"—IEEE Transactions on Consumer Electronics—vol. 43 No. 1 Feb. 1997.

* cited by examiner

*Primary Examiner*—Jingge Wu
*Assistant Examiner*—Bernard Krasnic

(57) ABSTRACT

Systems and methods of denoising images are described. In one aspect, spatially-shifted forward transforms of the input image are computed. Each forward transform is computed based on a denoiser transform Z having an associated transpose Z', wherein a matrix multiplication between Z and Z' produces a diagonal matrix Λ, Z=F(D), F specifies a mapping from coefficients of D to coefficients of Z, and D substantially corresponds to a frequency-domain transform. The forward transforms are denoised based on nonlinear mappings derived from quantization values linked to the input image. Spatially-shifted inverse transforms of the denoised forward transforms are computed. Each inverse transform is computed based on Z and Z'. An output image is computed based on a combination of spatially-shifted inverse transforms.

28 Claims, 4 Drawing Sheets

TRANSFORMATIONS FOR DENOISING IMAGES

TECHNICAL FIELD OF THE INVENTION

This invention relates to transformations for denoising images.

BACKGROUND OF THE INVENTION

Digital images and video frames are compressed in order to reduce data storage and transmission requirements. In most image compression methods, certain image data is discarded selectively to reduce the amount of data needed to represent the image while avoiding substantial degradation of the appearance of the image.

Transform coding is a common image compression method that involves representing an image by a set of transform coefficients. The transform coefficients are quantized individually to reduce the amount of data that is needed to represent the image. A representation of the original image is generated by applying an inverse transform to the transform coefficients. Block transform is coding is a common type of transform coding method. In a typical block transform coding process, an image is divided into small rectangular regions (or "blocks"), which are subjected to forward transform, quantization and coding operations. Many different kinds of block transforms may be used to encode the blocks. Among the common types of block transforms are the cosine transform (which is the most common), the Fourier transform, the Hadamard transform, and the Haar wavelet transform. These transforms produce an M×N array of transform coefficients from an M×N block of image data, where M and N have integer values of at least 1.

The quality of an image often is degraded by a block transform coding process. For example, discontinuities often are introduced at the block boundaries in the reconstructed image and ringing artifacts often are introduced near image boundaries.

Different approaches have been proposed for enhancing compressed images by reducing the appearance of artifacts introduced by block transform coding processes. Among the most common image enhancement approaches are approaches that filter along block boundaries, approaches that optimize by projecting onto convex sets, and approaches that perform wavelet transform thresholding. Another approach for enhancing compressed images involves the reapplication of shifted JEPG transforms to a JPEG image. In particular, this approach re-applies the JPEG compression operator to shifted versions of the already-compressed image and averages all of the resulting images to produce an enhanced output image.

SUMMARY OF THE INVENTION

The invention features systems and methods of denoising images.

The invention features systems and methods in which spatially-shifted forward transforms of the input image are computed. Each forward transform is computed based on a denoiser transform Z having an associated transpose Z', wherein a matrix multiplication between Z and Z' produces a diagonal matrix $\Lambda$, $Z=F(D)$, F specifies a mapping from coefficients of D to coefficients of Z, and D substantially corresponds to a frequency-domain transform. The forward transforms are denoised based on nonlinear mappings derived from quantization values linked to the input image. Spatially-shifted inverse transforms of the denoised forward transforms are computed. Each inverse transform is computed based on Z and Z'. An output image is computed based on a combination of spatially-shifted inverse transforms.

Other features and advantages of the invention will become apparent from the following description, including the drawings and the claims.

DETAILED DESCRIPTION OF THE INVENTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Compressing an Original Image

Figure 1:
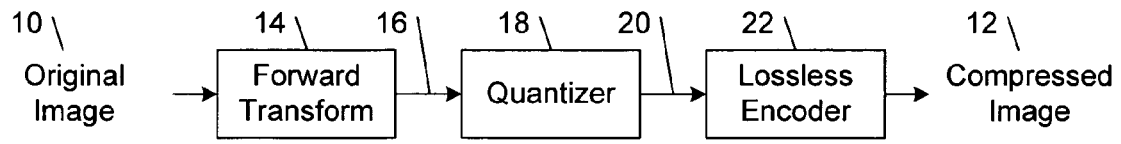
FIG. 1 is a block diagram of a system for compressing an original image.

FIG. 1 shows a prior art method of processing an original image 10 to produce a compressed image 12. In accordance with the illustrated method, a forward transform 14 is applied to the original image 10 to produce a set of forward transform coefficients 16. The forward transform 14 may be any type of transform that is operable to convert the original image 10 into a set of coefficients in a selected domain. A quantizer 18 is applied individually to the forward transform coefficients 16 to produce a set of quantized forward coefficients 20. The quantizer 18 discards some of forward transform coefficient information, enabling the original image 10 to be compressed. An encoder 22 encodes the quantized forward transform coefficients using any type of lossless encoding technique to produce the compressed image 12.

Original image 10 may be a binary image (e.g., a dark and bright dot pattern), a multilevel single-color image (e.g., a gray-level image), or a multilevel multi-color image. In general, the image compression process of FIG. 1 is applied individually to each color plane of the original image 10.

Figure 2:
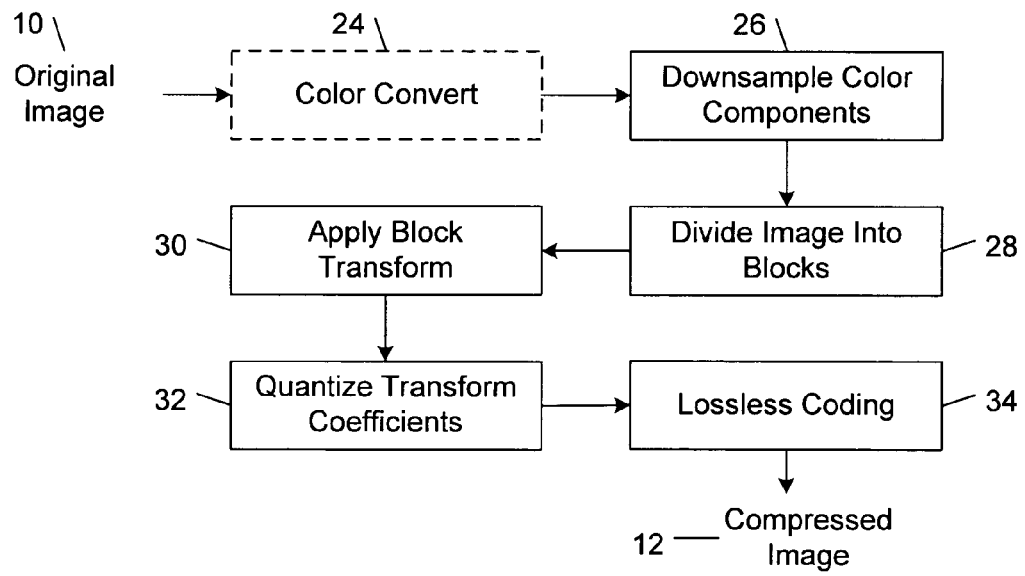
FIG. 2 is a flow diagram of a block-transform-based method of compressing an original image.

FIG. 2 shows a prior art block-transform-based image method of compressing original image 10. In accordance with this method, original image 10 initially is converted into a preselected luminance-based color space (e.g., the YCrCb color space), if the original image 10 is not already specified in the preselected color space (block 24). Each color plane of the image in the preselected color space corresponds to a respective image (i.e., an array of pixel values) that is processed individually as follows. The color components (e.g., the Cr and Cb color components) are downsampled (block 26). Each color plane is divided into blocks of pixels (e.g., 8×8 pixel blocks) (block 28). A block transform is applied to each pixel block individually (block 30). Any kind of block transform may be applied to the blocks. Exemplary types of block transforms include the cosine transform, Fourier transform, Hadamard transform, and Haar wavelet transform. The resulting transform coefficients are quantized (block 32). The quantized transform coefficients are encoded using a lossless coding technique to produce compressed image 12 (block 34).

II. Reducing Artifacts in Compressed Images

The embodiments described below are configured to reduce artifacts inherently introduced by processes that are used to create compressed images. In many instances, these embodiments reduce image compression artifacts without degrading image quality, such as by blurring features in the image. As described in detail below, some implementations of these embodiments are particularly well-suited to substantially reduce ringing and blocking compression artifacts that are introduced by block-transform-based image compression techniques, such as block discrete cosine transform (DCT) image compression techniques.

Figure 3:
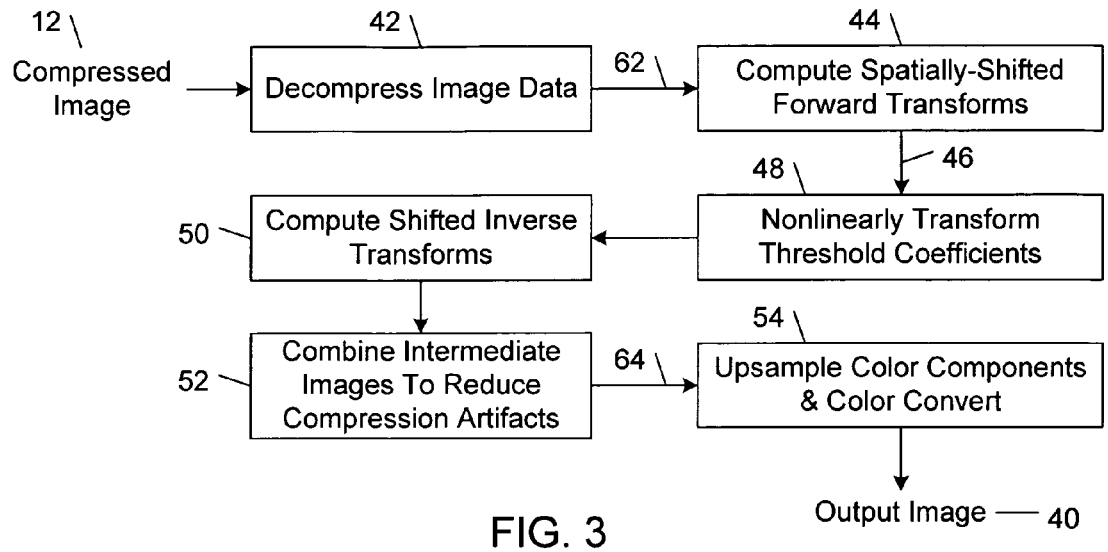
FIG. 3 is a flow diagram of an embodiment of a method of processing a compressed image to produce an output image characterized by reduced compression artifacts.

FIG. 3 shows an embodiment of a method of processing a compressed image 12 that is generated by the block-transform-based image compression method of FIG. 2 to produce an output image 40 with reduced compression artifacts. In this method, each plane of the compressed image 12 is processed individually. The compressed image data initially is decompressed (block 42). Spatially-shifted forward transforms are computed from the decompressed image data 62 (block 44). In this process, a forward transform operation is applied to each of multiple shifted versions of the decompressed image data 62 to produce multiple respective sets of forward transform coefficients 46. For example, in an implementation in which the image 12 is compressed based on blocks of M×N pixels, the forward transform operation is applied to the decompressed image data 62 on a subset containing K shifts from the M×N independent shifts possible in an M×N transform to produce K sets of forward transform coefficients, where K, M, and N have integer values of at least 1. In one exemplary implementation, both M and N have a value of 8.

The forward transform coefficients 46 of each set are nonlinearly transformed (block 48). An inverse transform operation (block 50) is applied to the sets of nonlinearly transformed forward transform coefficients 46 to produce respective intermediate images. As explained in detail below, the intermediate images are combined to reduce compression artifacts in each color plane 64 (block 52). The color component image planes (e.g., Cr and Cb) are upsampled to the original resolution and the resulting image planes are converted back to the color space (e.g., the Red-Green-Blue color space) of the original image 10 (block 54). The image planes are combined to produce the output image 40.

Figure 4:
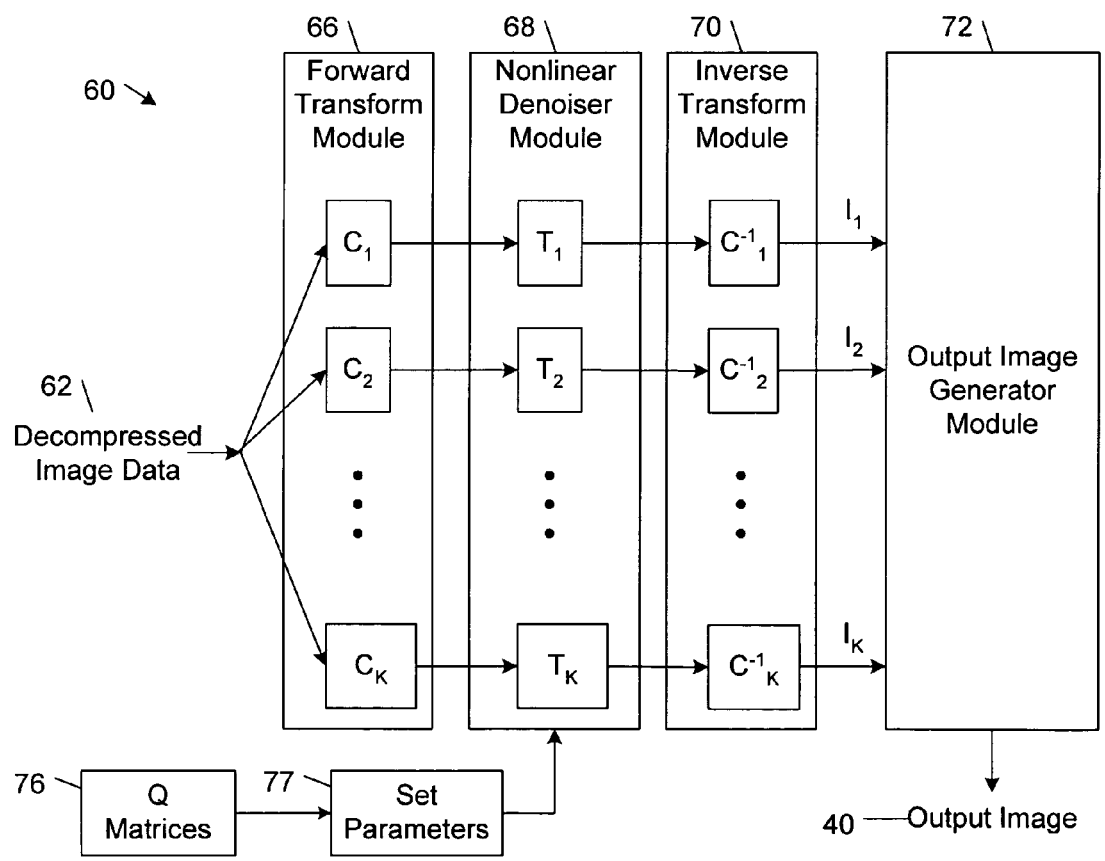
FIG. 4 is a block diagram of an embodiment of an image processing system for implementing output image generator steps in the method of FIG. 3.

FIG. 4 shows an embodiment of a system 60 for processing the decompressed image data 62 generated by the method of FIG. 3 to produce the compression-artifact-reduced output image 40. Processing system 60 includes a forward transform module 66, a nonlinear denoiser module 68, an inverse transform module 70, and an output image generator module 72. In general, the modules 66-72 of system 60 are not limited to any particular hardware or software configuration, but rather they may be implemented in any computing or processing environment, including in digital electronic circuitry or in computer hardware, firmware, device driver, or software. For example, in some implementations, these modules 66-72 may be embedded in the hardware of any one of a wide variety of electronic devices, including digital cameras, printers, and portable electronic devices (e.g., mobile phones and personal digital assistants). In addition, although full (or complete) input images are processed in the illustrated embodiments, other embodiments may be configured to sequentially process a series of sub-image portions (e.g., swaths) of an input image.

A. Forward Transform Module

The forward transform module 66 computes from the decoded image data 62 K sets ($C_1, C_2, \ldots, C_K$) of shifted forward transforms, corresponding to K unique positions of a blocking grid relative to the compressed image 12. As explained in detail below, a class of forward transforms is used that enables artifacts in the decompressed image 62 to be reduced substantially in substantially multiplier-free hardware implementations.

In general, each block of the forward transform is computed based on a denoiser transform Z having an associated transpose Z', wherein a matrix multiplication between Z and Z' produces a diagonal matrix $\Lambda$, Z=F(D), F specifies a mapping from coefficients of D to coefficients of Z, and D substantially corresponds to a frequency-domain transform. Each block of the spatially-shifted forward transforms $C_1$ (i=1, 2, . . . , K) may be computed based on the separable application of the denoiser transform Z in two dimensions as follows:

$$B = ZXZ' \quad (1)$$

where X corresponds to a block of the decompressed image data 62, and B corresponds to the transform coefficients of the image block X. In some implementations, the mapping function F specifies a mapping from coefficients of D to coefficients of Z having values selected from 0 and $\pm 2^N$ where N has an integer value. This allows the matrix multiplication specified in equation (1) to be computed trivially or easily by simple binary shifts in software or may be implemented in hardware without requiring a multiplier.

The mapping function F may specify a mapping from weighted coefficients of D to corresponding coefficients of Z. In these implementations, the coefficients of D are weighted by respective scaling factors, which may be the same or different. In one exemplary embodiment, the mapping function F corresponds to a rounding operator applied to the weighted coefficients of D. That is:

$$Z_{ij} = \text{round}\{\alpha_{ij} \cdot D_{ij}\} \quad (2)$$

wherein round{ } is the rounding operator, $Z_{ij}$ is the coefficient of Z in row i and column j, $D_{ij}$ is the coefficient of D in row i and column j, and $\alpha_{ij}$ is the respective scaling factor for $D_{ij}$. In one implementation, the coefficients of D are weighted by a common (i.e., the same) scaling factor (i.e., $\alpha_{ij} = \alpha$ for all i,j), in which case:

$$Z_{ij} = \text{round}\{\alpha \cdot D_{ij}\} \quad (3)$$

Other exemplary mapping functions include arithmetic operators, such as the floor operator, the ceiling operator, and the truncate operator. The floor operator returns the largest integer less than or equal to the argument. The ceiling operator returns the smallest integer greater than or equal to the argument. The truncate operator functions like the floor operator for positive argument values and like the ceiling operator for negative argument values. Still other mapping functions that produce integer approximations to the coefficients of D may be used to generate the coefficients of the denoiser transform Z.

In some implementations, D is a block-based linear transform, such as a discrete cosine transform (DCT). In one dimension, the DCT transform is given to four decimal places by the following 8 by 8 matrix:

$$P = \begin{bmatrix} 1 & 0 & 0 & 0 & 0 & 0 & 0 & 0 \\ 0 & 0 & 0 & 0 & 0 & 1 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 0 & 0 & 0 & 1 \\ 0 & 1 & 0 & 0 & 0 & 0 & 0 & 0 \\ 0 & 0 & 0 & 0 & 1 & 0 & 0 & 0 \\ 0 & 0 & 0 & 1 & 0 & 0 & 0 & 0 \\ 0 & 0 & 0 & 0 & 0 & 0 & 1 & 0 \end{bmatrix} \quad (7)$$

$$D = \begin{bmatrix} 0.3536 & 0.3536 & 0.3536 & 0.3536 & 0.3536 & 0.3536 & 0.3536 & 0.3536 \\ 0.4904 & 0.4157 & 0.2778 & 0.0975 & -0.0975 & -0.2778 & -0.4157 & -0.4904 \\ 0.4619 & 0.1913 & -0.1913 & -0.4619 & -0.4619 & -0.1913 & 0.1913 & 0.4619 \\ 0.4157 & -0.0975 & -0.4904 & -0.2778 & 0.2778 & 0.4904 & 0.0975 & -0.4157 \\ 0.3536 & -0.3536 & -0.3536 & 0.3536 & 0.3536 & -0.3536 & -0.3536 & 0.3536 \\ 0.2778 & -0.4904 & 0.0975 & 0.4157 & -0.4157 & -0.0975 & 0.4904 & -0.2778 \\ 0.1913 & -0.4619 & 0.4619 & -0.1913 & -0.1913 & 0.4619 & -0.4619 & 0.1913 \\ 0.0975 & -0.2778 & 0.4157 & -0.4904 & 0.4904 & -0.4157 & 0.2778 & -0.0975 \end{bmatrix} \quad (4)$$

Applying equation (3) with $\alpha=3.5$ to the one-dimensional DCT transform of equation (4) yields the following denoiser transform:

$$Z = \begin{bmatrix} 1 & 1 & 1 & 1 & 1 & 1 & 1 & 1 \\ 2 & 1 & 1 & 0 & 0 & -1 & -1 & -2 \\ 2 & 1 & -1 & -2 & -2 & -1 & 1 & 2 \\ 1 & 0 & -2 & -1 & 1 & 2 & 0 & -1 \\ 1 & -1 & -1 & 1 & 1 & -1 & -1 & 1 \\ 1 & -2 & 0 & 1 & -1 & 0 & 2 & -1 \\ 1 & -2 & 2 & -1 & -1 & 2 & -2 & 1 \\ 0 & -1 & 1 & -2 & 2 & -1 & 1 & 0 \end{bmatrix} \quad (5)$$

In this implementation, the diagonal matrix $\Lambda$ satisfying the condition that $ZZ'=\Lambda$ is given by equation (5):

$$A = \begin{bmatrix} 8 & 0 & 0 & 0 & 0 & 0 & 0 & 0 \\ 0 & 12 & 0 & 0 & 0 & 0 & 0 & 0 \\ 0 & 0 & 20 & 0 & 0 & 0 & 0 & 0 \\ 0 & 0 & 0 & 12 & 0 & 0 & 0 & 0 \\ 0 & 0 & 0 & 0 & 8 & 0 & 0 & 0 \\ 0 & 0 & 0 & 0 & 0 & 12 & 0 & 0 \\ 0 & 0 & 0 & 0 & 0 & 0 & 20 & 0 \\ 0 & 0 & 0 & 0 & 0 & 0 & 0 & 12 \end{bmatrix} \quad (6)$$

Other exemplary values for the scaling factor $\alpha$ in equation (3) include 3.0 and 2.5.

In some implementations, the blocks of the spatially-shifted forward transforms $(C_1, C_2, \ldots, C_K)$ are computed based on a factorization of the denoiser transform Z. For example, the denoiser transform of equation (5) may be implemented by a fast factorization $Z=PR_3R_2R_1$, where P is a permutation matrix, and $R_1$, $R_2$, And $R_3$ are sparse factor matrices given by:

-continued $$R_3 = \begin{bmatrix} 1 & 1 & 0 & 0 & 0 & 0 & 0 & 0 \\ 1 & -1 & 0 & 0 & 0 & 0 & 0 & 0 \\ 0 & 0 & 1 & 2 & 0 & 0 & 0 & 0 \\ 0 & 0 & -2 & 1 & 0 & 0 & 0 & 0 \\ 0 & 0 & 0 & 0 & 1 & 0 & -2 & 1 \\ 0 & 0 & 0 & 0 & 0 & 1 & 1 & 2 \\ 0 & 0 & 0 & 0 & -2 & 1 & -1 & 0 \\ 0 & 0 & 0 & 0 & -1 & -2 & 0 & 1 \end{bmatrix} \quad (8)$$

$$R_2 = \begin{bmatrix} 1 & 0 & 0 & 1 & 0 & 0 & 0 & 0 \\ 0 & 1 & 1 & 0 & 0 & 0 & 0 & 0 \\ 0 & 1 & -1 & 0 & 0 & 0 & 0 & 0 \\ 1 & 0 & 0 & -1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix} \quad (9)$$

$$R_1 = \begin{bmatrix} 1 & 0 & 0 & 0 & 0 & 0 & 0 & 1 \\ 0 & 1 & 0 & 0 & 0 & 0 & 1 & 0 \\ 0 & 0 & 1 & 0 & 0 & 1 & 0 & 0 \\ 0 & 0 & 0 & 1 & 1 & 0 & 0 & 0 \\ 0 & 0 & 0 & 1 & -1 & 0 & 0 & 0 \\ 0 & 0 & 1 & 0 & 0 & -1 & 0 & 0 \\ 0 & 1 & 0 & 0 & 0 & 0 & -1 & 0 \\ 1 & 0 & 0 & 0 & 0 & 0 & 0 & -1 \end{bmatrix} \quad (10)$$

Computer code for an implementation of the fast factorization shown in equations (7)-(10) for the forward denoiser transform of equation (5) and the corresponding factorization for the corresponding inverse denoiser transform $(Z^{-1})$ is contained in the attached Appendix.

In some other implementations, D is a wavelet-based decomposition transform. In one of these implementations, for example, D may be a forward discrete wavelet transform (DWT) that decomposes a one-dimensional (1-D) sequence (e.g., line of an image) into two sequences (called sub-bands), each with half the number of samples. In this implementation, the 1-D sequence may be decomposed according to the following procedure: the 1-D sequence is separately low-pass and high-pass filtered by an analysis filter bank; and the filtered signals are downsampled by a factor of two to form the low-pass and high-pass sub-bands.

B. Nonlinear Denoiser Module

The nonlinear denoiser module 68 nonlinearly transforms the output transform coefficients that are computed from the sets ($C_1, C_2, \ldots, C_K$) of shifted forward transforms that are computed by the forward transform module 66.

Figure 5:
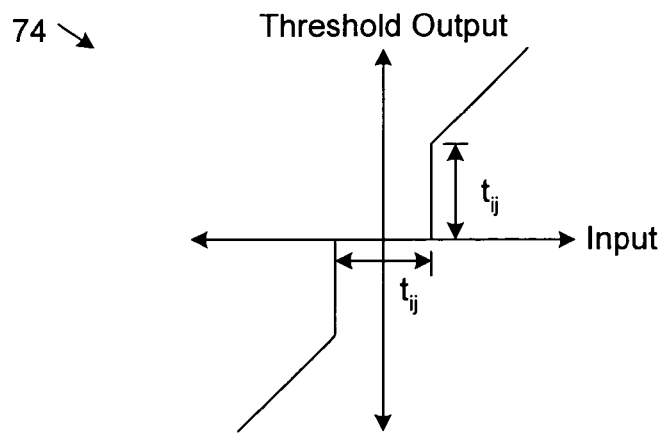
FIG. 5 is a graph of threshold output in an implementation of the nonlinear denoiser module of FIG. 4 plotted as a function of input transform coefficient values.

In some implementations, the sets of forward transform coefficients are transformed in accordance with respective nonlinear thresholding transformations ($T_1, T_2, \ldots, T_K$). FIG. 5 shows a graph 74 of threshold output plotted as a function of input coefficient values in accordance with an embodiment of the denoiser module 68. In this embodiment, the forward transform coefficients are nonlinearly transformed by setting to zero each coefficient with an absolute value below a respective threshold ($t_{ij}$, where i,j refer to the indices of the quantization element, with i having values in the range of 0 to M-1 and j having values in the range of 0 to N-1) and leaving unchanged each coefficient with an absolute value equal to or above a respective threshold ($t_{ij}$). Quantization matrices 76 (or "Q Matrices") are used to set the parameters $t_{ij}$ for the nonlinear thresholding transformations ($T_1, T_2, \ldots, T_K$). In some implementations, the quantization matrices contain the same quantization parameters $q_{ij}$ that were originally used to compress image 12. These quantization parameters may be stored in the compressed image 12 in accordance with a standard image compression scheme (e.g., JPEG).

In some implementations, the threshold parameters $t_{ij}$ are set in block 77 by a function M that maps the quantization parameters $q_{ij}$ of the Q matrices to the corresponding threshold parameters $t_{ij}$. In some of these implementations, the function M is an affine function that maps the quantization parameters $q_{ij}$ to the $t_{ij}$ in accordance with equation (11):

$$t_{ij} = \beta_{ij} \cdot q_{ij} + \gamma_{ij} \quad (11)$$

where $\beta_{ij}$ and $\gamma_{ij}$ are respective constants. The $\beta_{ij}$ may be the same or different. Similarly, the $\gamma_{ij}$ may be the same or different. In some embodiments implemented in accordance with the forward denoiser transform implementations specified in equation (3), $\gamma_{ij}=0$ and $\beta_{ij}=\alpha_{ij}$ for all i,j (i.e., the scaling factors used to compute the coefficients of Z from the coefficients of D are the same as the scaling factors used to compute the thresholds $t_{ij}$).

Based on equation (1) and the diagonal matrix condition $ZZ'=\Lambda$, one may derive the identity matrix condition $Z'\Lambda^{-1}Z=I$. The block X of the decompressed image data 62 may be recovered as follows:

$$X = Z'[\Lambda^{-1}B\Lambda^{-1}]Z \quad (12)$$

where the quantity in brackets of equation (12) determines the scaling of the coefficients B that needs to be applied before multiplying by Z' on the left and multiplying by Z on the right. Since the quantity in brackets involves multiplying by a diagonal matrix on the right and a diagonal matrix on the left, the scaling factor for the i,j element of B is given by component-wise multiplication by a matrix S with components given by $s_{ij}=\lambda_i^{-1}\lambda_j^{-1}$, where $\lambda_i^{-1}$ is the inverse of the $i^{th}$ diagonal element of the matrix $\Lambda$. In the implementation of equations (5) and (6), S is given to four decimal places by:

$$S = \begin{matrix}
0.0156 & 0.0104 & 0.0063 & 0.0104 & 0.0156 & 0.0104 & 0.0063 & 0.0104 \\
0.0104 & 0.0069 & 0.0042 & 0.0069 & 0.0104 & 0.0069 & 0.0042 & 0.0069 \\
0.0063 & 0.0042 & 0.0025 & 0.0042 & 0.0063 & 0.0042 & 0.0025 & 0.0042 \\
0.01047 & 0.0069 & 0.0042 & 0.0069 & 0.0104 & 0.0069 & 0.0042 & 0.0069 \\
0.0156 & 0.0104 & 0.0063 & 0.0104 & 0.0156 & 0.0104 & 0.0063 & 0.0104 \\
0.0104 & 0.0069 & 0.0042 & 0.0069 & 0.0104 & 0.0069 & 0.0042 & 0.0069 \\
0.0063 & 0.0042 & 0.0025 & 0.0042 & 0.0063 & 0.0042 & 0.0025 & 0.0042 \\
0.0104 & 0.0069 & 0.0042 & 0.0069 & 0.0104 & 0.0069 & 0.0042 & 0.0069
\end{matrix} \quad (13)$$

In some implementations, the non-trivial multiplications that are specified in equations (12) and (13) are absorbed in the nonlinear denoising computations performed by module 68. In some of these implementations, the nonlinear denoiser module 68 modifies the forward transform coefficients $C_{ij}$ in accordance with equation (14), which incorporates the nonlinear transform of FIG. 5:

$$\Gamma_{ij} = s_{ij} \cdot C_{ij} \quad \text{if } s_{ij} \cdot C_{ij} \geq t_{ij} \quad (14)$$
$$= 0 \quad \text{otherwise.}$$

where $\Gamma_{ij}$ are the denoised coefficients output from the nonlinear denoiser module 68.

In some embodiments, the nonlinear denoiser module 68 also incorporates sharpness enhancements by modifying the nonlinearities, $T_i$. In particular, nonlinear denoiser module 68 multiplies the nonlinear transform parameter values $q_{ij}$ by gain factors $g_{ij}$. There are many ways to set the gain factors. In one implementation, the gain factors are given by equation (15):

$$g_{ij} = 1.0 + \phi^*(i+j)/14 \quad (15)$$

where i and j are the indices selecting each quantizer coefficient. In implementations designed for 8×8 blocking grids, the values of i and j are in the range [0-7], with 0 representing the lowest spatial frequency, and 7 representing the highest spatial frequency. The value of sharpness factor, s, determines the amount of sharpening. When $\phi=0$, no sharpening is applied. Values of $\phi$ between 0.5 and 1.5 provide an adequate sharpness range to compensate for slight blurring that might be caused by the output image generator methods. A matrix containing exemplary gain factors computed from equation (1) for $\phi=0.5$ is provided in Table 1, below:

TABLE 1

| Gain Factors $g_{ij}$ for $\phi = 0.5$ | | | | | | | |
|---|---|---|---|---|---|---|---|
| 1.0000 | 1.0357 | 1.0714 | 1.1071 | 1.1429 | 1.1786 | 1.2143 | 1.2500 |
| 1.0357 | 1.0714 | 1.1071 | 1.1429 | 1.1786 | 1.2143 | 1.2500 | 1.2857 |
| 1.0714 | 1.1071 | 1.1429 | 1.1786 | 1.2143 | 1.2500 | 1.2857 | 1.3214 |
| 1.1071 | 1.1429 | 1.1786 | 1.2143 | 1.2500 | 1.2857 | 1.3214 | 1.3571 |
| 1.1429 | 1.1786 | 1.2143 | 1.2500 | 1.2857 | 1.3214 | 1.3571 | 1.3929 |
| 1.1786 | 1.2143 | 1.2500 | 1.2857 | 1.3214 | 1.3571 | 1.3929 | 1.4286 |
| 1.2143 | 1.2500 | 1.2857 | 1.3214 | 1.3571 | 1.3929 | 1.4286 | 1.4643 |
| 1.2500 | 1.2857 | 1.3214 | 1.3571 | 1.3929 | 1.4286 | 1.4643 | 1.5000 |

C. Inverse Transform Module

The inverse transform module 70 computes sets ($C^{-1}_1, C^{-1}_2, \ldots, C^{-1}_K$) of inverse transforms from the sets of nonlinearly transformed forward transform coefficients. The inverse transform module 70 applies the inverse of the forward transform operation that is applied by forward transform module 66. The outputs of the inverse transform module 70 are intermediate images ($I_1, I_2, \ldots, I_K$) representing the image data in the spatial domain. The terms inverse transforms ($C^{-1}_1, C^{-1}_2, \ldots, C^{-1}_K$) and intermediate images ($I_1, I_2, \ldots, I_K$) are used synonymously herein. The blocks of the spatially-shifted inverse transforms ($C^{-1}_1, C^{-1}_2, \ldots, C^{-1}_K$) may be computed by replacing B in equation (12) with the output of the denoiser module 68.

D. Output Image Generator Module

The output image generator module 72 combines the intermediate images ($I_1, I_2, \ldots, I_K$) to form the image planes 64 of the final output image 40. In general, the output image generator module 72 computes output image 40 based on a combination of intermediate images ($I_1, I_2, \ldots, I_K$) For example, in some implementations, the output image 40 is computed from a weighted combination of the intermediate images ($I_1, I_2, \ldots, I_K$) In one of these implementations, the output image 40 corresponds to an average of the intermediate images ($I_1, I_2, \ldots, I_K$).

Figure 6:
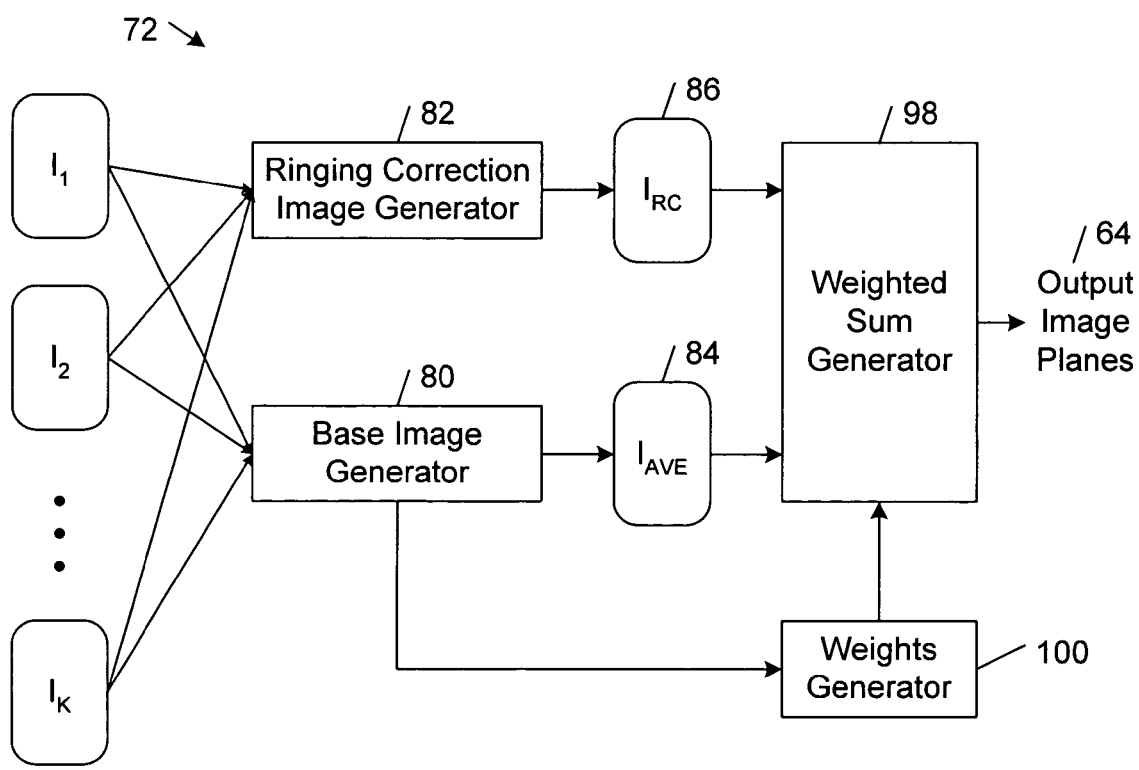
FIG. 6 is a block diagram of an implementation of the output image generator module in of FIG. 4.

FIG. 6 shows an embodiment of the output image generator module 72 that includes a base image generator 80 and a ringing correction image generator 82.

The base image generator 80 computes a base image 84 corresponding to an estimate of the original uncompressed image from a combination of the intermediate images ($I_1, I_2, \ldots, I_K$) In the illustrated embodiment, base image generator 80 computes a base image ($I_{AVE}$) that has pixel values corresponding to averages of corresponding pixels in the intermediate images ($I_1, I_2, \ldots, I_K$).

The ringing correction image generator 82 computes a ringing correction image ($I_{RC}$) based on the intermediate images ($I_1, I_2, \ldots, I_K$) In some implementations, the ringing correction image generator 82 computes a ringing correction image 86 ($I_{RC}$) based at least in part on measures of local spatial intensity variability that are computed for pixels of the intermediate images ($I_1, I_2, \ldots, I_K$) For example, in a minimum variance de-ringing implementation, the value of a given pixel of the ringing correction image 86 is set to the value of the corresponding intermediate image pixel having the lowest computed measure of spatial intensity variability of all the intermediate image pixels corresponding to the pixel in the ringing correction image 86. In a weighted variance de-ringing approach, each pixel value of the ringing correction image 86 is assigned a value corresponding to an average of multiple corresponding intermediate image pixels in a lowest percentile (e.g., the 30% percentile) of local spatial variability measures of all the intermediate image pixels corresponding to the given pixel in the ringing correction image 86. The weighted variance de-ringing approach has been observed to reduce ringing compression artifacts while avoiding noise that sometimes is introduced by the minimum variance de-ringing approach.

Figure 7:
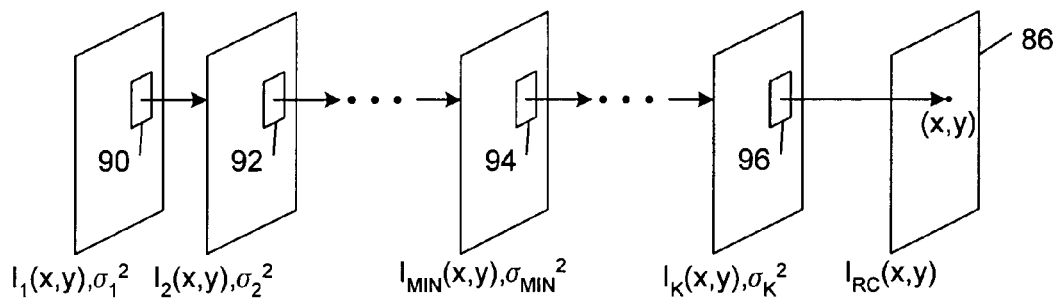
FIG. 7 is a diagrammatic view of a set of intermediate images and a ringing correction image generated from the set of intermediate images.

Referring to FIG. 7, in some embodiments, spatial intensity variability is measured by the spatial variance ($\sigma_1^2, \sigma_2^2, \ldots, \sigma_K^2$), which is computed for pixels of the intermediate images ($I_1(x,y), I_2(x,y), \ldots, I_K(x,y)$) corresponding to a given pixel $I_{RC}(x,y)$ in the ringing correction image 86. The spatial variance measures are computed based on respective intermediate image regions defined by respective windows 90, 92, 94, 96. In the illustrated embodiment, the windows 90-96 have dimensions of 3 pixels in width by 3 pixels in height. In one exemplary implementation, the spatial variance ($\sigma_0$) for a given intermediate image pixel $I_j(x,y)$ is given by equation (17):

$$\sigma_0^2 = \frac{1}{K} \cdot \sum_{j=1}^{K} (V_j - \langle V \rangle)^2 \tag{16}$$

where $\langle V \rangle$ is the average pixel value in the neighborhood of the given pixel $$\left(\text{i.e., } \langle V \rangle = \frac{1}{K} \sum_{i=1}^{K} V_i\right)$$

and K is the number (e.g., nine) of pixels in the neighborhood of the given pixel in the ringing correction image 86. In the illustrated embodiment, the value of the intermediate image pixel (e.g., ($I_{MIN}(x,y)$)) with the smallest computed variance ($\sigma_{MIN}^2$) is assigned to the corresponding pixel ($I_{RC}(x,y)$) in the ringing correction image 86.

In another exemplary implementation, the spatial variability ($\Delta_0$) for a given intermediate image pixel $I_j(x,y)$ with a value $V_0$ is given by equation (18):

$$\Delta_0^2 = \frac{1}{K} \cdot \sum_{j=1}^{K} (V_j - V_0)^2 \tag{17}$$

It has been observed that the base image 84 is characterized by a substantial reduction in the appearance of compression artifacts, such as blocking artifacts, but in some cases the base image 84 still contains residual ringing artifacts. It also has been observed that the ringing correction image 86 ($I_{RC}$) is characterized by substantially reduced ringing compression artifacts relative to the base image 84, but otherwise is generally more blurry than the base image 84. Based on these observations, the output image generator module 72 is configured to combine the base image 84 and the ringing correction image 86 in ways that substantially reduce the appearance of compression artifacts in the resulting output image 40.

In the embodiment of FIG. 6, the output image generator module 72 includes a weighted sum generator 98 that computes weighted sums of corresponding pixels of the base image 84 ($I_{AVE}(x,y)$) and the ringing correction image 86 ($I_{RC}(x,y)$) to generate the values of the pixels of the output image 40 in accordance with equation (19):

$$I_{OUT}(x,y) = \alpha(x,y) \cdot I_{RC}(x,y) + (1 - \alpha(x,y)) \cdot I_{AVE}(x,y) \tag{18}$$

where $\alpha$ has a value in the range [0,1].

A weights generator module 100 computes the values of $\alpha(x,y)$ for each pixel of the output image 40. In general, for pixels that are sufficiently far from sharp transitions, where the expected ringing is minimal, the weights generator module 100 sets $\alpha(x,y) \approx 0$. For pixels on a sharp transition, the weights generator module 100 also sets $\alpha(x,y) \approx 0$ in order to not blur the transition. For pixels that are sufficiently close to (e.g., adjacent to) but not on a sharp transition, the weights generator module 100 sets $\alpha(x,y) \approx 1$ to reduce the potential ringing.

Figure 8:
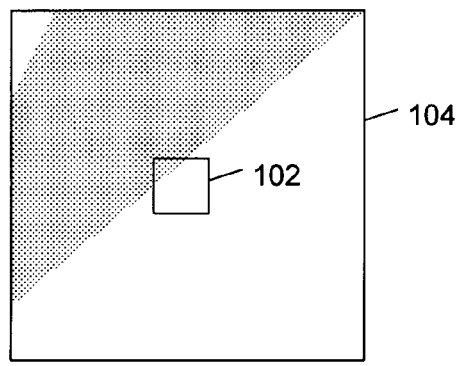
FIG. 8 is a block diagram of a pair of concentric windows used to compute a measure of block contrast and a measure of local contrast from pixel values of a base image.

In some embodiments, the weights generator module 100 computes $\alpha(x,y)$ for a given pixel based on a measure of relative contrast between a local region in a spatial window encompassing the given pixel and a larger region in a spatial window surrounding the local region. In some implementations, image contrast is computed from the pixel range, which is the difference, in a spatial window, between maximum and minimum pixel values. As shown in FIG. 8, in these implementations, the pixel range is calculated for windows 102, 104 of two different sizes. The size of the first window 102 is small (e.g., 3 pixels by 3 pixels) in order to accurately estimate local contrast near edges. In some implementations, the size of the second window 104 (e.g., 15 pixels by 15 pixels) covers all of the shifted block transforms at a given pixel. The pixel range calculations result in a local contrast measure, lc, and a block contrast measure, bc.

Figure 9:
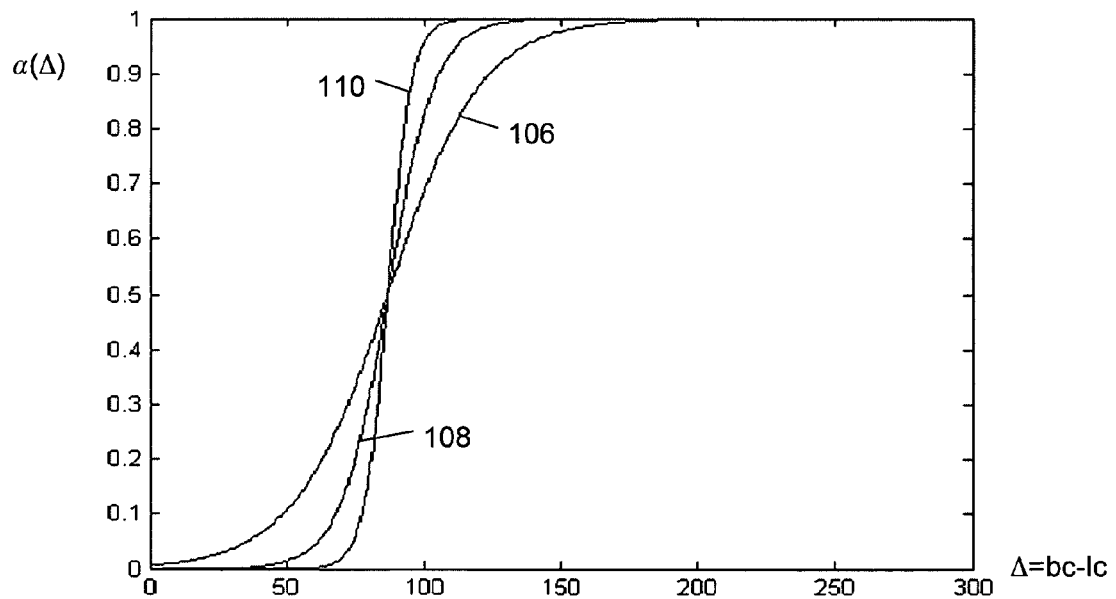
FIG. 9 are graphs of weighting values plotted as functions of contrast difference between measures of block contrast and local contrast computed for a pixel of a base image.

The weights generator module 100 inputs the difference ($\Delta$) between the local and block contrast measures (i.e., $\Delta(x, y)$=bc(x,y)−lc(x,y)) into a function $\alpha(\Delta)$, which may be stored as a lookup table, to generate a value of $\alpha(\Delta)$ in the range [0,1]. Three different weighting functions 106, 108, 110 are shown in FIG. 9. These functions correspond to the general function given by equation (20):

$$\alpha(\Delta) = \frac{1}{1 + e^{-(\Delta - T)/a}} \quad (19)$$

where a and T are variable parameters. A final lookup table for $\alpha(\Delta)$, which was trained with test images using subjective evaluations and objective PSNR (Peak Signal-To-Noise Ratio) values, is provided in Table 2 below. This table is presented in "reading order" (i.e., left to right, top to bottom):

TABLE 2

Weights Lookup 0.000045, 0.000051, 0.000057, 0.000065, 0.000073, 0.000082, 0.000092,
0.000103, 0.000116, 0.000130, 0.000147, 0.000165, 0.000185, 0.000208,
0.000234, 0.000263, 0.000296, 0.000333, 0.000374, 0.000421, 0.000473,
0.000532, 0.000598, 0.000672, 0.000755, 0.000849, 0.000955, 0.001073,
0.001207, 0.001356, 0.001525, 0.001714, 0.001927, 0.002166, 0.002434,
0.002736, 0.003075, 0.003456, 0.003884, 0.004365, 0.004905, 0.005512,
0.006193, 0.006958, 0.007816, 0.008779, 0.009860, 0.011072, 0.012432,
0.013956, 0.015664, 0.017577, 0.019719, 0.022117, 0.024798, 0.027796,
0.031144, 0.034881, 0.039048, 0.043691, 0.048858, 0.054601, 0.060975,
0.068040, 0.075858, 0.084493, 0.094010, 0.104477, 0.115961, 0.128525,
0.142232, 0.157137, 0.173288, 0.190724, 0.209470, 0.229535, 0.250913,
0.273574, 0.297470, 0.322526, 0.348645, 0.375706, 0.403567, 0.432063,
0.461017, 0.490236, 0.519521, 0.548673, 0.577495, 0.605799, 0.633410,
0.660172, 0.685949, 0.710628, 0.734120, 0.756358, 0.777300, 0.796925,
0.815232, 0.832237, 0.847968, 0.862468, 0.875787, 0.887984, 0.899121,
0.909265, 0.918480, 0.926835, 0.934395, 0.941223, 0.947381, 0.952926,
0.957912, 0.962391, 0.966410, 0.970013, 0.973241, 0.976129, 0.978713,
0.981022, 0.983085, 0.984927, 0.986572, 0.988039, 0.989347, 0.990514,
0.991554, 0.992481, 0.993307, 0.994043, 0.994698, 0.995282, 0.995801,
0.996264, 0.996676, 0.997042, 0.997368, 0.997659, 0.997917, 0.998147,
0.998352, 0.998534, 0.998695, 0.998840, 0.998968, 0.999082, 0.999183,
0.999274, 0.999354, 0.999425, 0.999489, 0.999545, 0.999596, 0.999640,
0.999680, 0.999715, 0.999747, 0.999775, 0.999800, 0.999822, 0.999842,
0.999859, 0.999875, 0.999889, 0.999901, 0.999912, 0.999922, 0.999930,
0.999938, 0.999945, 0.999951, 0.999956, 0.999961, 0.999965, 0.999969,
0.999973, 0.999976, 0.999978, 0.999981, 0.999983, 0.999985, 0.999986,
0.999988, 0.999989, 0.999990, 0.999992, 0.999992, 0.999993, 0.999994,
0.999995, 0.999995, 0.999996, 0.999996, 0.999997, 0.999997, 0.999997,
0.999998, 0.999998, 0.999998, 0.999998, 0.999999, 0.999999, 0.999999,
0.999999, 0.999999, 0.999999, 0.999999, 0.999999, 0.999999, 0.999999,
1.000000, 1.000000, 1.000000, 1.000000, 1.000000, 1.000000, 1.000000,
1.000000, 1.000000, 1.000000, 1.000000, 1.000000, 1.000000, 1.000000,
1.000000, 1.000000, 1.000000, 1.000000, 1.000000, 1.000000, 1.000000,
1.000000, 1.000000, 1.000000, 1.000000, 1.000000, 1.000000, 1.000000,
1.000000, 1.000000, 1.000000, 1.000000, 1.000000, 1.000000, 1.000000,
1.000000, 1.000000, 1.000000, 1.000000, 1.000000, 1.000000, 1.000000,
1.000000, 1.000000, 1.000000, 1.000000

Other embodiments are within the scope of the claims.

For example, although the above compression artifact reduction embodiments are described in connection with an image 12 that is compressed by a block-transform-based image compression method, these embodiments readily may be used to reduce artifacts in images compressed by other non-block-transform-based image compression techniques.

APPENDIX

The following computer code corresponds to an implementation of the fast factorization shown in equations (6)-(9) for the forward denoiser transform of equation (4) and the corresponding factorization for the corresponding inverse denoiser transform $Z^{-1}$. The inputs for this implementation are 64 element integer arrays.

```
void int_Forward_Denosier_Transform(int f[ ])
{
  int c;
  int * r, tmp0, tmp1, tmp2, tmp3, tmp4, tmp5, tmp6, tmp7;
  int tmp10, tmp11, tmp12, tmp13;
  for (r = f, c = 0; c < 8; c++, r++) {      // process columns
    tmp0 = r[ 0] + r[56]; tmp7 = r[ 0] - r[56];
    tmp1 = r[ 8] + r[48]; tmp6 = r[ 8] - r[48];
    tmp2 = r[16] + r[40]; tmp5 = r[16] - r[40];
    tmp3 = r[24] + r[32]; tmp4 = r[24] - r[32];
    tmp10 = tmp0 + tmp3; tmp13 = tmp0 - tmp3;
    tmp11 = tmp1 + tmp2; tmp12 = tmp1 - tmp2;
    r[0] = tmp10 + tmp11; r[32] = tmp10 - tmp11;
    r[16] = tmp12 + (tmp13 << 1); r[48] = tmp13 - (tmp12 << 1);
    /* Bottom half of the matrix */
    tmp10 = tmp4 + tmp7; tmp13 = tmp7 - tmp4;
    tmp11 = tmp5 + tmp6; tmp12 = tmp5 - tmp6;
    r[40] = tmp10 - (tmp6 << 1);
    r[8] = tmp11 + (tmp7 << 1);
    r[56] = tmp12 - (tmp4 << 1);
    r[24] = tmp13 - (tmp5 << 1);
  }
  for (r = f, c = 0; c < 8; c++, r += 8) {    // process rows
    tmp0 = r[0] + r[7]; tmp7 = r[0] - r[7];
    tmp1 = r[1] + r[6]; tmp6 = r[1] - r[6];
    tmp2 = r[2] + r[5]; tmp5 = r[2] - r[5];
    tmp3 = r[3] + r[4]; tmp4 = r[3] - r[4];
    tmp10 = tmp0 + tmp3; tmp13 = tmp0 - tmp3;
    tmp11 = tmp1 + tmp2; tmp12 = tmp1 - tmp2;
    r[0] = tmp10 + tmp11; r[4] = tmp10 - tmp11;
    r[2] = tmp12 + (tmp13 << 1); r[6] = tmp13 - (tmp12 << 1);
    /* Bottom half of the matrix */
    tmp10 = tmp4 + tmp7; tmp13 = tmp7 - tmp4;
    tmp11 = tmp5 + tmp6; tmp12 = tmp5 - tmp6;
    r[5] = tmp10 - (tmp6 << 1);
    r[1] = tmp11 + (tmp7 << 1);
    r[7] = tmp12 - (tmp4 << 1);
    r[3] = tmp13 - (tmp5 << 1);
  }
}
void int_Inverse_Denosier_Transform(int f[])
{
  int c;
  int * r, tmp0, tmp1, tmp2, tmp3, tmp4, tmp5, tmp6, tmp7;
  int tmp10, tmp11, tmp12, tmp13, z10, z11, z12, z13;
  for (r = f, c = 0; c < 8; c++, r += 8) {  // process rows
    tmp10 = r[0] + r[4]; tmp11 = r[0] - r[4];
    tmp12 = r[2] - (r[6] << 1); tmp13 = (r[2] << 1) + r[6];
    tmp0 = tmp10 + tmp13; tmp3 = tmp10 - tmp13;
    tmp1 = tmp11 + tmp12; tmp2 = tmp11 - tmp12;
    z10 = r[5] - r[3]; z13 = r[5] + r[3];
    z11 = r[1] + r[7]; z12 = r[1] - r[7];
    tmp4 = z10 - (r[7] << 1);
    tmp5 = z11 - (r[3] << 1);
    tmp6 = z12 - (r[5] << 1);
    tmp7 = z13 + (r[1] << 1);
    r[0] = tmp0 + tmp7; r[7] = tmp0 - tmp7;
    r[1] = tmp1 + tmp6; r[6] = tmp1 - tmp6;
```

-continued

```
    r[2] = tmp2 + tmp5; r[5] = tmp2 - tmp5;
    r[3] = tmp3 + tmp4; r[4] = tmp3 - tmp4;
  }
  for (r = f, c = 0; c < 8; c++, r++) { // process columns
    tmp10 = r[0] + r[32]; tmp11 = r[0] - r[32];
    tmp12 = r[16] - (r[48] << 1); tmp13 = (r[16] << 1) + r[48];
    tmp0 = tmp10 + tmp13; tmp3 = tmp10 - tmp13;
    tmp1 = tmp11 + tmp12; tmp2 = tmp11 - tmp12;
    z10 = r[40] - r[24]; z13 = r[40] + r[24];
    z11 = r[8] + r[56]; z12 = r[8] - r[56];
    tmp4 = z10 - (r[56] << 1);
    tmp5 = z11 - (r[24] << 1);
    tmp6 = z12 - (r[40] << 1);
    tmp7 = z13 + (r[8] << 1);
    r[0] = tmp0 + tmp7; r[56] = tmp0 - tmp7;
    r[8] = tmp1 + tmp6; r[48] = tmp1 - tmp6;
    r[16] = tmp2 + tmp5; r[40] = tmp2 - tmp5;
    r[24] = tmp3 + tmp4; r[32] = tmp3 - tmp4;
  }
}
```

What is claimed is:

1. A method of processing an input image compressed in accordance with a block discrete cosine transform (DCT) image compression process, comprising:
computing spatially-shifted forward transforms of the input image, each of the forward transforms being computed based on a denoiser transform Z having an associated transpose Z', wherein a matrix multiplication between Z and Z' produces a diagonal matrix $\Lambda$, Z=F(D), F specifies a nonlinear mapping from coefficients of D to coefficients of Z, and D substantially corresponds to a frequency-domain transform;
denoising the forward transforms based on nonlinear mappings derived from quantization values linked to the input image;
computing spatially-shifted inverse transforms of the denoised forward transforms, each of the inverse transforms being computed based on Z and Z'; and
computing an output image based on a combination of ones of the spatially-shifted inverse transforms.

2. The method of claim 1, wherein D is a block-based linear transform.

3. The method of claim 2, wherein the computing of the spatially-shifted forward transforms comprises applying a forward transform operation to each of multiple positions of a blocking grid relative to the input image and the spatially-shifted inverse transforms are computed based on the relative positions of the blocking grid used to compute corresponding ones of the spatially-shifted forward transforms.

4. The method of claim 2, wherein D is a discrete cosine transform.

5. The method of claim 3, wherein D is a one-dimensional discrete cosine transform.

6. The method of claim 5, wherein F is an arithmetic operator.

7. The method of claim 6, wherein F is a rounding arithmetic operator.

8. The method of claim 1, wherein F is a mapping from coefficients of D to corresponding coefficients of Z having values selected from 0 and $\pm 2^N$ where N has an integer value.

9. The method of claim 1, wherein F is a mathematical operator corresponding to one of a rounding operator, a floor operator, a ceiling operator, and a truncate operator, and the computing of the forward transform coefficients comprises applying the mathematical operator to coefficients of D weighted by respective scaling factors to obtain corresponding coefficients of Z.

10. The method of claim 9, wherein the computing of the forward transform coefficients comprises weighting the coefficient of D by a common scaling factor.

11. The method of claim 10, wherein F corresponds to a rounding operator applied to the weighted coefficients of D.

12. The method of claim 9, wherein the denoising comprises applying to the forward transforms nonlinear mappings derived from the quantization values linked to the input image and weighted by respective scaling factors.

13. The method of claim 1, wherein the computing of the forward transforms is based on a factorization of Z.

14. The method of claim 1, wherein the input image corresponds to a decompressed version of an input image compressed based on a given quantization process and the forward transforms are denoised based on the given quantization process.

15. The method of claim 1, wherein the forward transforms are denoised by setting to zero each of the forward transform coefficients with an absolute value below a respective threshold derived from a respective one of the quantization values linked to the input image and leaving unchanged each of the forward transform coefficients with an absolute equal to at least a respective threshold derived from a respective ones of the quantization values linked to the input image.

16. The method of claim 15, further comprising sharpening the forward transform coefficients by increasing nonlinear transform parameters by respective factors that are larger for higher spatial frequency forward transform coefficients than for lower spatial frequency forward transform coefficients.

17. The method of claim 1, wherein the output image is computed from a weighted combination of the inverse transforms.

18. The method of claim 17, wherein the computed output image corresponds to an average of the inverse transforms.

19. The method of claim 1, wherein $Z_{ij}$=round$\{(3.5) \cdot D_{ij}\}$, round$\{\}$ is a rounding operator, $Z_{ij}$ is a coefficient of Z in row i and column j, and $D_{ij}$ is the coefficient of a discrete cosine transform in row i and column j.

20. A method of processing an input image, comprising:
computing spatially-shifted forward transforms of the input image, each of the forward transforms being computed based on a denoiser transform Z having an associated transpose Z', wherein a matrix multiplication between Z and Z' produces a diagonal matrix $\Lambda$, Z=F(D), F specifies a mapping from coefficients of D weighted by a common scaling factor to corresponding coefficients of Z, and D substantially corresponds to a frequency-domain transform;
denoising the forward transforms based on nonlinear mappings derived from quantization values linked to the input image, wherein the nonlinear mappings are derived from quantization values weighted by the common scaling factor;
computing spatially-shifted inverse transforms of the denoised forward transforms, each of the inverse transforms being computed based on Z and Z'; and
computing an output image based on a combination of ones of the spatially-shifted inverse transforms.

21. A method of processing an input image, comprising:
computing spatially-shifted forward transforms of the input image, each of the forward transforms being computed based on a denoiser transform Z having an associated transpose Z', wherein a matrix multiplication between Z and Z' produces a diagonal matrix $\Lambda$, Z=F(D), F specifies a nonlinear mapping from coefficients of D to coefficients of Z, and D substantially corresponds to a frequency-domain transform;

denoising the forward transforms based on nonlinear mappings derived from quantization values linked to the input image;

computing spatially-shifted inverse transforms of the denoised forward transforms, each of the inverse transforms being computed based on Z and Z'; and computing an output image based on a combination of ones of the spatially-shifted inverse transforms, wherein computing the output image comprises computing a base image from a combination of ones of the inverse transforms, computing a ringing correction image based at least in part on computed measures of local spatial intensity variability for pixels of each of the inverse transforms, and combining pixel values from the base image and the ringing correction image.

22. The method of claim 21, wherein the base image has pixel values corresponding to respective averages of values of corresponding pixels in the inverse transforms.

23. The method of claim 21, further comprising assigning to each pixel in the ringing correction image a value of a corresponding inverse transform pixel having a lowest computed measure of local spatial intensity variability of the corresponding inverse transform pixels.

24. The method of claim 21, further comprising assigning to each pixel in the ringing correction image a value corresponding to an average of multiple corresponding inverse transform pixels in a lowest percentile of local spatial variability measures of the corresponding inverse transform pixels.

25. The method of claim 21, wherein the output image is computed by a weighted combination of the base image and the ringing correction image.

26. The method of claim 21, wherein in the combining the base image contributes less to the output image than the ringing correction image for pixels adjacent to transition regions in the base image.

27. A system for processing an input image compressed in accordance with a block discrete cosine transform (DCT) image compression process, comprising:

a forward transform module configured to compute spatially-shifted forward transforms of the input image, each of the forward transforms being computed based on a denoiser transform Z having an associated transpose Z', wherein a matrix multiplication between Z and Z' produces a diagonal matrix $\Lambda$, $Z=F(D)$, F specifies a nonlinear mapping from coefficients of D to coefficients of Z, and D substantially corresponds to a frequency-domain transform;

a nonlinear denoiser module configured to denoise the forward transforms based on nonlinear mappings derived from quantization values linked to the input image;

an inverse transform module configured to compute spatially-shifted inverse transforms of the denoised forward transforms based on Z and Z'; and an output image generator module configured to compute an output image based on a combination of ones of the spatially-shifted inverse transforms.

28. A computer-readable medium storing computer-readable instructions for processing an image compressed in accordance with a block discrete cosine transform (DCT) image compression process, the computer-readable instructions being executable to cause a computer to perform operations comprising:

computing spatially-shifted forward transforms of the input image, each of the forward transforms being computed based on a denoiser transform Z having an associated transpose Z', wherein a matrix multiplication between Z and Z' produces a diagonal matrix $\Lambda$, $Z=F(D)$, F specifies a nonlinear mapping from coefficients of D to coefficients of Z, and D substantially corresponds to a frequency-domain transform;

denoising the forward transforms based on nonlinear mappings derived from quantization values linked to the input image;

computing spatially-shifted inverse transforms of the denoised forward transforms based on Z and Z'; and computing an output image based on a combination of ones of the spatially-shifted inverse transforms.

* * * * *

UNITED STATES PATENT AND TRADEMARK OFFICE
CERTIFICATE OF CORRECTION

PATENT NO. : 7,388,999 B2  Page 1 of 1
APPLICATION NO. : 10/696140
DATED : June 17, 2008
INVENTOR(S) : Ramin Samadani It is certified that error appears in the above-identified patent and that said Letters Patent is hereby corrected as shown below:

In column 1, line 23, after "transform" delete "is".

In column 4, line 33, delete "(i=1, 2, ..., K)" and insert -- (1 = 1, 2, ..., K) --, therefor.

In column 5, line 51, delete "A =" and insert -- $\Lambda$ = --, therefor.

In column 13, line 63, in Claim 8, delete "±2N" and insert -- $\pm 2^N$ --, therefor.

In column 14, line 39, in Claim 19, delete "$Z_{ij}$," and insert -- $Z_{ij}$ --, therefor.

Signed and Sealed this

Sixth Day of January, 2009

JON W. DUDAS
*Director of the United States Patent and Trademark Office*